June 25, 1957 C. HILL 2,796,941
FOUR WHEEL DRIVE FOR AUTOMOTIVE VEHICLES
Filed June 8, 1953 6 Sheets-Sheet 1

INVENTOR
Claude Hill
By Carlson, Pitzner, Hubbard & Wolfe
ATTORNEYS

June 25, 1957  C. HILL  2,796,941
FOUR WHEEL DRIVE FOR AUTOMOTIVE VEHICLES
Filed June 8, 1953  6 Sheets-Sheet 3

INVENTOR
Claude Hill
By Carlson, Pitzner, Hubbard & Wolfe
ATTORNEYS

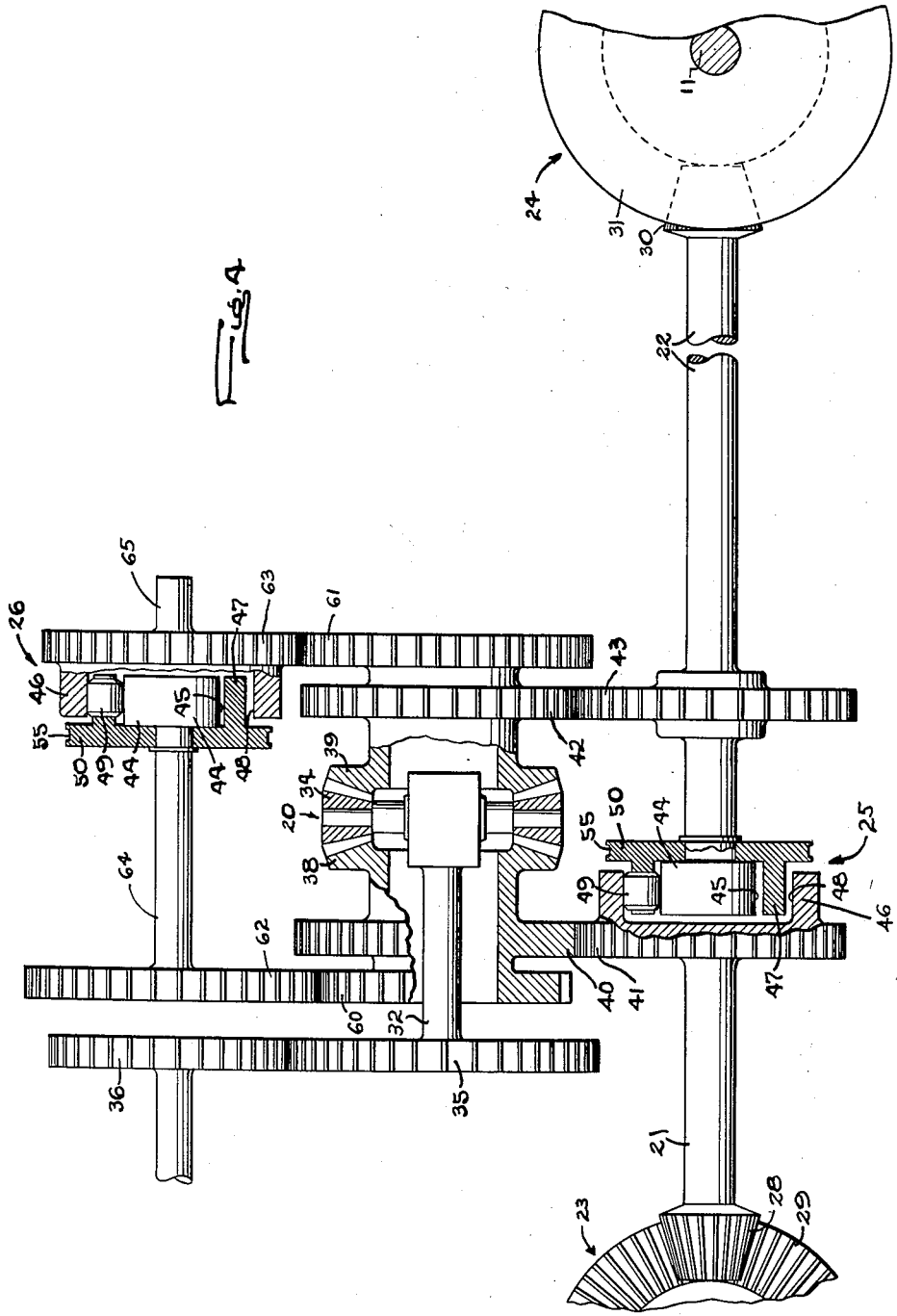

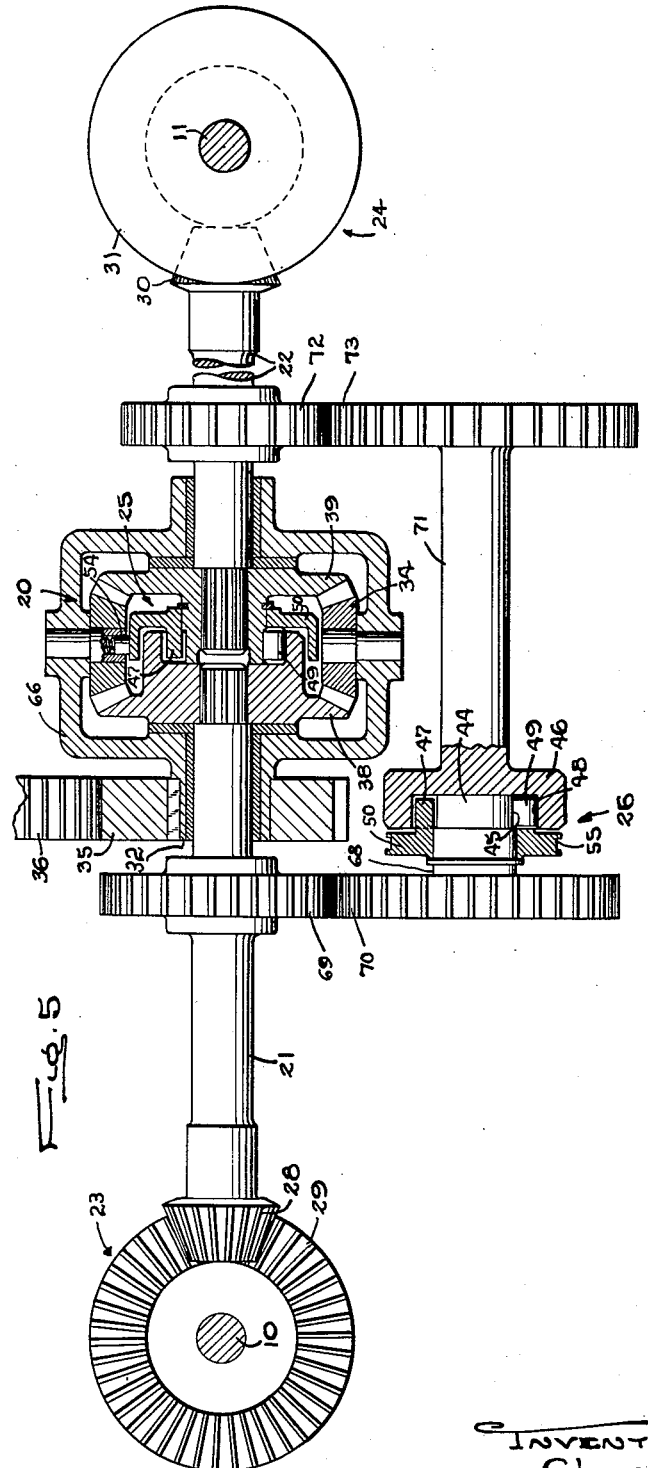

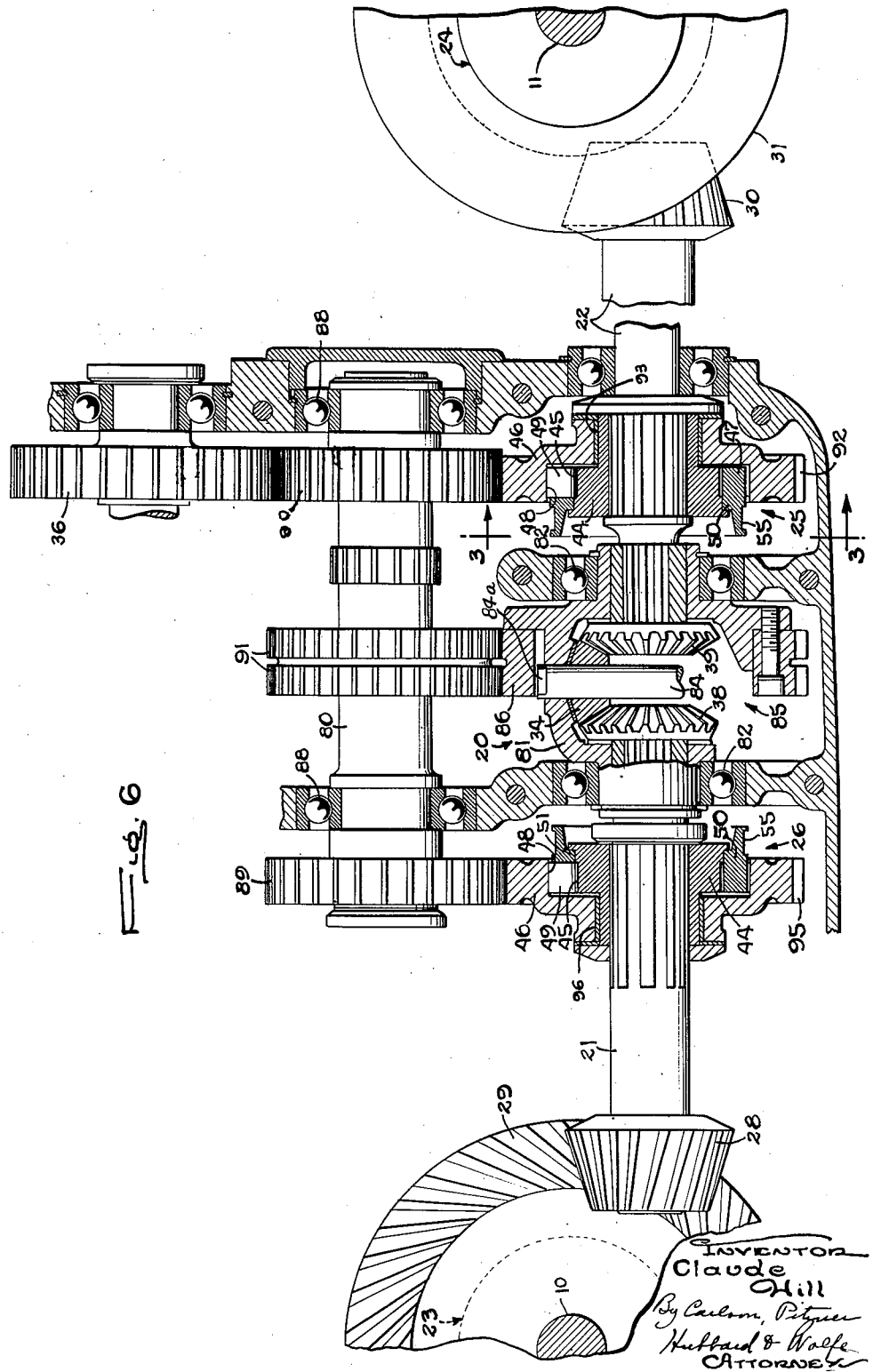

United States Patent Office 2,796,941
Patented June 25, 1957

2,796,941

FOUR WHEEL DRIVE FOR AUTOMOTIVE VEHICLES

Claude Hill, Kenilworth, England, assignor to Harry Ferguson Research Limited, Stow-on-the-Wold, England, a British company Application June 8, 1953, Serial No. 360,128

Claims priority, application Great Britain June 9, 1952

19 Claims. (Cl. 180—44)

The present invention relates to drives for automotive vehicles having multiple pairs of traction wheels as, for example, a four wheel drive. In subsequent references to "four wheel" drives it is contemplated that the drive may extend to additional pairs of wheels yielding a total of six, eight, or more traction wheels. In any event there is to be a minimum of four.

The general aim of the present invention is to provide what will be, indeed, a real four wheel drive under all conditions of operation. The aim here has been to afford a four wheel drive that can be used continuously, on all kinds of roads or terrain, without wearing tires more than with an ordinary two wheel drive of a pleasure or commercial vehicle.

More particularly, it is an object of this invention to provide a four wheel drive system which eliminates circumferential tire scraping or "scrub" due either to variations in effective tire diameters, or to overspeeding of the front wheels relative to the rear wheels on cornering (i. e., turning).

Still another object of the invention is to provide such a four wheel drive system having free differential action between front and rear pairs of wheels for turns or differences in wheel radii, and automatically operative means for preventing loss of tractive power by one pair of wheels when one or both of the wheels in the other pair spins on a slippery surface.

Additionally, it is an object to provide such a four wheel drive which enhances four wheel braking action, preventing loss of braking effort when one wheel tends to lock and skid.

A further object is to provide, in such a four wheel drive system, a division of torque between front and rear pairs of driving wheels such as to achieve maximum traction correlated with the differences in weight carried by the respective pairs of wheels.

Other objects and advantages will become apparent as the following description proceeds, taken in conjunction with the accompanying drawings, in which:

Fig. 4 is an enlarged view, partially in section, of a first modified embodiment of the invention;

Fig. 5 is an enlarged view, partially in section, of a second modified embodiment of the invention; and Fig. 6 is an enlarged view, partially in section, of a third modified embodiment of the invention.

Figure 1:
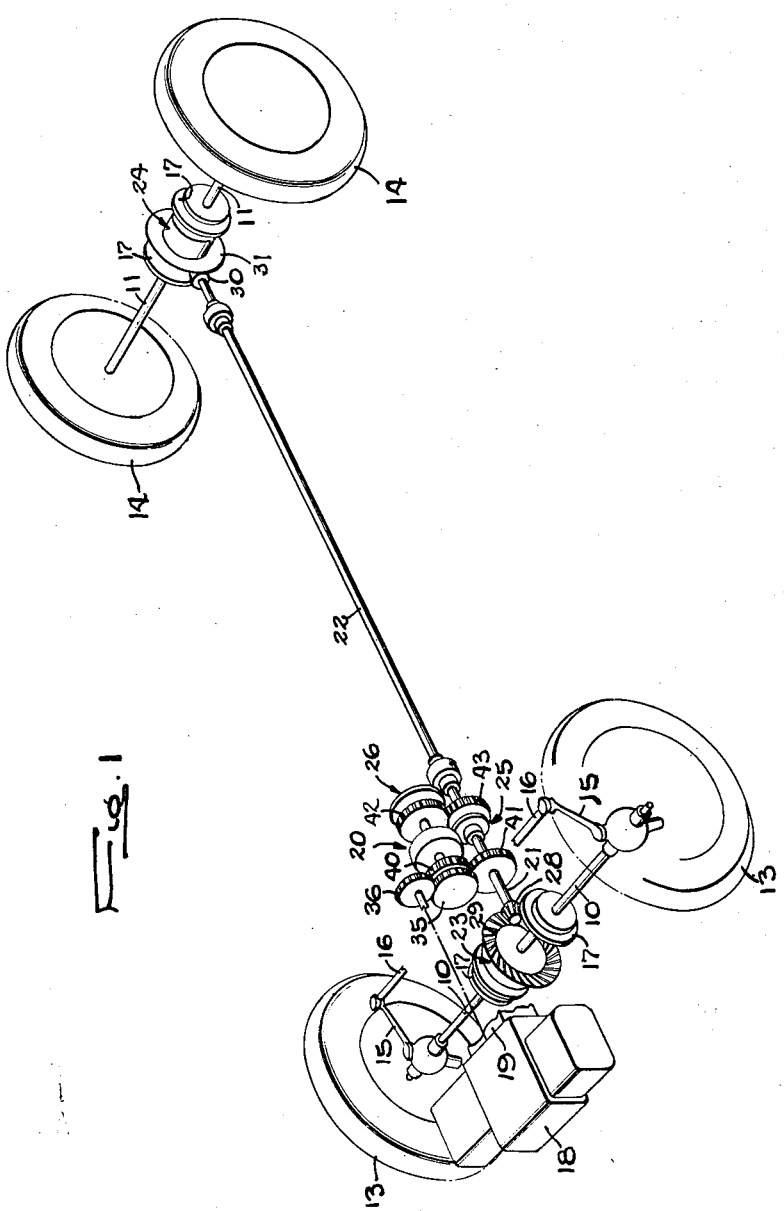
Figure 1 is a perspective view of one embodiment of the present four wheel drive system, shown schematically on an automotive vehicle.

While the invention has been illustrated and described in some detail with reference to particular preferred embodiments, there is no intention to thereby limit the invention to such details. On the contrary, the intention is to cover all alterations, modifications, and equivalents falling within the spirit and scope of the invention as defined by the appended claims.

It has been recognized that inasmuch as the tractive effort obtainable from a driven automobile wheel is proportional to its coefficient of friction with the ground and the weight on the wheel, maximum traction for a four wheel vehicle can, theoretically at least, best be obtained by supplying tractive effort to all four wheels. This concept underlies the employment of known four wheel drive systems in military vehicles or trucks intended for operation over unimproved terrain. However, certain prohibitive conditions and problems arise in the provision of known four wheel drive systems which have thus far precluded their employment in pneumatic tired commercial and passenger vehicles. For example, if all four wheels are positively engaged by mechanisms driven from the engine, a severe amount of tire scraping or "cornering scrub" occurs as an incident to the execution of turns by the vehicle, for under such conditions the front wheels must run through an arc of greater radius than that of the rear wheels and therefore tend to rotate faster than the rear wheels. In such a system, also, slight differences in effective wheel radii caused by inevitable differences in tire inflation, tread wear, or variations in loadings, result in the occurrence of what is known as "circumferential scrub." Under such conditions the wheels having smaller radii necessarily tend to rotate faster than those having larger radii while traversing the same distance. If the wheels are positively driven together at the same angular speed by the drive system, then on corners the front wheels are bodily scraped over the ground surface and on straight travel the rear wheels, if loaded or worn to have smaller radii, are bodily scraped over the ground surface. Tires will not long withstand such abuse. In addition, undue stresses or "wind up" occurs in the driving parts and fuel consumption is excessive.

The seriousness of cornering and circumferential scrub in producing tire wear and severe stresses on the drive system has resulted in prior vehicles being provided with manually operated clutch (or disengageable gear) arrangements enabling the front wheels of the vehicle to be selectively engaged or disengaged for positive drive effort. In these arrangements, it is intended that the front wheels be driven in a four wheel drive arrangement, and with acceptance of tire scrub, only when the surface conditions do not permit operation of the vehicle with two wheel drive. The advantages of maximum tractive effort and smooth power application to all four wheels obviously cannot be realized with such a stop-gap arrangement.

As another partial expedient in overcoming these undesirable effects of cornering and circumferential scrub, it has also heretofore been proposed that three differentials be employed in a four wheel drive system. More specifically, it has been proposed that front and rear drive shafts serve, respectively, to drive front and rear differentials and that the shafts be powered from the engine through a center or third differential. Such a three differential system clearly permits overspeeding of any one or more of the wheels as a result of rounding corners, or one of the wheels having a small effective radius, and maintains torque to such overrunning wheel. However, there arises a serious drawback in that if one wheel should encounter a slippery or icy patch of ground and lose all traction, it will spin freely and the differentials will cause the other three wheels to exert no driving torque. In other words, loss of traction by one of the four wheels results in the whole vehicle being stalled. Conversely, on braking, the skidding of one wheel likewise would result, in such a three differential arrangement, in a reduction in the overall braking effect for a given pedal pressure. This is more fully explained below in discussing the braking accomplished in the presently disclosed vehicle. In attempts to overcome such defects, manually operable locking means have been proposed many years ago for one or more of the three differentials and which were to be engaged to eliminate differential action and positively lock the driven parts together. These are, however, inherently so limited in effectiveness that they have never found any commercial acceptance. They would generally be engaged too late, that is, after the vehicle is already in trouble. If left engaged, they would set up destructive strains. When engaged, there could be no differential action even though such action is necessary to prevent the aforementioned cornering and circumferential tire scrub.

For some thirty years the problem has defied solution in this art. Solution is here afforded.

Referring now to Fig. 1, a four wheel drive system of the present invention is there shown in connection with only those parts of an automotive vehicle necessary to make clear the environment of its application. The vehicle in this instance includes front and rear pairs of live half axles 10 and 11 carrying front and rear pairs of traction wheels 13 and 14 equipped with pneumatic tires. The front wheels 13 are pivoted on the outer ends of their axles 10 for Ackerman type steering action under the control of knuckle arms 15 and tie rods 16 extending to a suitable steering mechanism (not shown). Four wheel brakes are provided, that is, means for braking each half axle. In Fig. 1, brake discs 17 are illustrated on each half axle for cooperating with any suitable form of disc-type brake mechanism (not shown). The vehicle has an engine 18 which supplies power through a clutch and speed change transmission assembly 19, and thence through the present four wheel drive system to both pairs of wheels.

In this four wheel drive system a center differential 20, adapted to be driven by the engine 18 through the speed change transmission assembly 19, serves to drive both front and rear drive shafts 21 and 22. The drive shafts, in turn, are connected to the front and rear pairs of wheel axles 10 and 11 through front and rear differentials 23 and 24 the latter permitting the unlimited freedom of relative overspeeding between the individual wheels of each pair. These front and rear differentials may be of conventional organization, having ring gears driven by pinions on the respective drive shafts. Means are, however, provided for locking out or inhibiting the center differential automatically (i. e., without any manual intervention whatever by the driver) whenever limited free ranges of differential action are exceeded for the front and rear pairs of wheels 13 and 14 respectively and for automatically restoring such action when the tendency to exceed the range ceases. The ranges are so chosen as to accommodate the relative over speeding of the front wheels 13 during steering, and relative variations in effective rear wheel radii due to changes in loading, wear, etc. Moreover, provision is made for controlled torque distribution.

In a generalized description, such automatic action is accomplished by drivingly connecting either directly or through speed change means, the two terminal elements (e. g. sun gears) of the center differential 20 with the front and rear drive shafts, respectively. The third element (e. g. planet carrier) of the center differential 20 is driven, either directly or indirectly through speed change means, from the transmission assembly 19. As will be explained in more dtail, an overrun device or clutch 25 is drivingly connected between two of the three differential elements by means which make the overrunning member of the device turn freely of and faster by a predetermined percentage than its cooperating driver member when the front and rear wheels turn at the same angular velocity. If, however, the front and rear wheels have a speed difference sufficiently great to tend to make the driver member overspeed the overrunning member, then the overrunning clutch locks and thus prevents a further degree of differential action.

A second overrun device or clutch 26 is preferably also drivingly interposed between two of the three elements of the center differential 20, either directly or indirectly by speed change means, such that its overrunning element normally turns freely of and faster by a second predetermined percentage than its cooperating driver element when the front and rear wheels turn at the same speed.

On the one hand, the first overrun device may lock and inhibit a further degree of differential action if the rear wheels 14 try to overspeed the front wheels 13 by a first predetermined percentage on the order of five percent to accommodate increased speed of the rear wheels as might occur as the diameter of the latter decreases due to loss of air pressure in the tires, tire deflection due to increased loading of the vehicle, or tire tread wear. Only if the rear wheels tend to slip (as in a mud hole) and overspeed the front wheels by an amount greater than occasioned by normally expected reduction in tire radii does the first overrun device 25 lock; but when it does lock, the action of the center differential is inhibited and useful torque is transmitted at least to the front wheels. On the other hand, the second overrun device 26 may lock and inhibit further action of the center differential 20 if the front wheels 13 try to overspeed the rear wheels 14 by more than a predetermined percentage—on the order of 20 percent—to accommodate the increased speed of the front wheels occasioned by the vehicle executing sharp corners. Only if the front wheels tend to slip (as in a mud hole) and overspeed the rear wheels by an amount greater than that which occurs on cornering does the second overrun device 26 lock; but when it does lock, the action of the center differential 20 is inhibited and useful torque is transmitted at least to the rear wheels.

The result is a positive drive to all four wheels under normal conditions—but with such differential freedom as to eliminate tire scrub. Yet, stalling of the vehicle if one or two wheels slip, as on a patch of ice, is automatically and positively precluded, for then the differential action is inhibited. And by making the overrun devices 25, 26 two-way in action, the system works equally well whether the vehicle is being driven forward or in reverse.

In the parlance of the mechanics, the center differential "diffs" when it should "diff" and does not "diff" when it should not.

Figure 2:
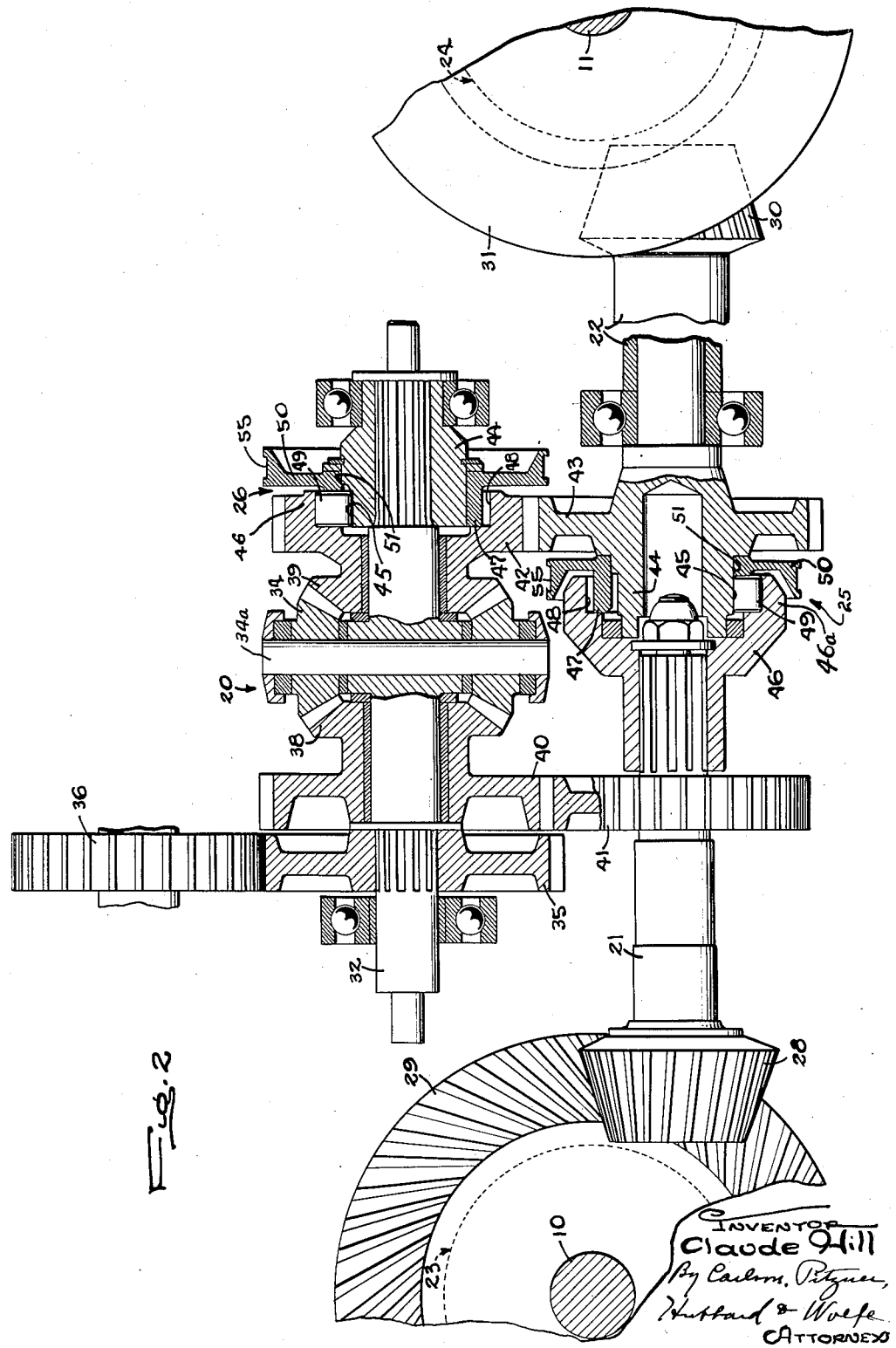
Fig. 2 is an enlarged view, partially in section, of the four wheel drive system.

With reference to Fig. 2, the first embodiment of the four wheel drive system here shown includes the front and rear differentials 23 and 24 for the respective front and rear pairs of wheels, respectively driven by the front and rear drive shafts 21 and 22. Means for making the front and rear pairs of wheels turn at the same angular speed when the rear drive shaft rotates more slowly, by a predetermined percentage, than the front drive shaft, may be embodied in different pinion and ring gear speed ratios for the front and rear differentials; that is, the speed step-down ratio in the front differential pinion 28 and ring gear 29 may be made greater than that in the rear differential pinion 30 and ring gear 31. Such ratios may be selected, for example, so that the rear drive shaft 22 rotates five percent more slowly than the front drive shaft 21 when the front and rear wheels 13 and 14 turn at the same angular speed.

The center differential 20 has first and second terminal elements 38 and 39 and an intermediate element 32, 34a, 34 adapted to be driven by the engine 18. As here shown, the intermediate element is embodied by a planet carrier shaft 32 supporting a carrier 34a or "spider" which journals planets 34. The intermediate element or planet carrier is driven from the engine by a gear 35 fixed to the shaft 32 and meshing with a transmission output gear 36. The terminal elements are embodied by sun wheels or gears 38 and 39 rotatably disposed on the planet carrier shaft 32 and adapted to be driven by the planets 34. The sun wheels 38 and 39 are drivingly connected to the front and rear drive shafts 21 and 22, respectively, by power transmission and speed change means shown embodied in the form of the matching spur gears 40—41 and 42—43. The relative diameter and speed change ratio of the front set of spur gears 40—41 is selected to provide speed step-up, i. e., such that the front drive shaft 21 rotates faster than its driving sun gear 38. On the other hand, the relative diameters and speed change ratio for the rear pair of spur gears 42—43 is selected so that the rear drive shaft 22 rotates more slowly than its driving sun gear 39. The gearing described is therefore selected so that the rear sun gear 39 runs faster than the front sun gear 38 when the front and rear wheels turn at the same angular speed, and therefore, it follows that the rear sun gear 39 turns faster than the planet carrier shaft 32 by a predetermined percentage when the front and rear wheels turn at the same angular speed.

The first two-way overrun device 25 is drivingly interposed between two of the three elements of the differential 20. In the exemplary form illustrated, the overrun device 25 is directly connected between the opposed ends of the drive shafts 21 and 22 which are, in turn, connected by gears 41, 40 and 43, 42 to the two terminal elements or sun gears of the differential 20. The first two-way overrun device 25 is oriented so that the front drive shaft 21 may freely overrun the rear drive shaft 22 in either direction of rotation, but upon the rear drive shaft achieving or tending to exceed the speed of the front drive shaft, the two become locked together for positive drive from one directly to the other.

The second two-way overrun or free wheeling device 26 is also drivingly interposed between two of the three elements of the differential 20. In this instance the device 26 includes elements mounted respectively on the terminal element or rear sun wheel 39 and on the intermediate element or planet carrier shaft 32. The organization and arrangement of such two-way overrun device is such that it will slip or permit free relative rotation of the planet carrier 32 and the rear sun wheel 39 so long as the sun wheel rotates at a faster angular speed, in either direction, with respect to the planet carrier. If, however, the planet carrier should slightly overspeed with relation to the rear sun gear, the two-way overrun device 26 causes the two parts to be locked together and the rear sun gear to be driven directly by the planet carrier shaft rather than through the planet gears 34.

Figure 3:
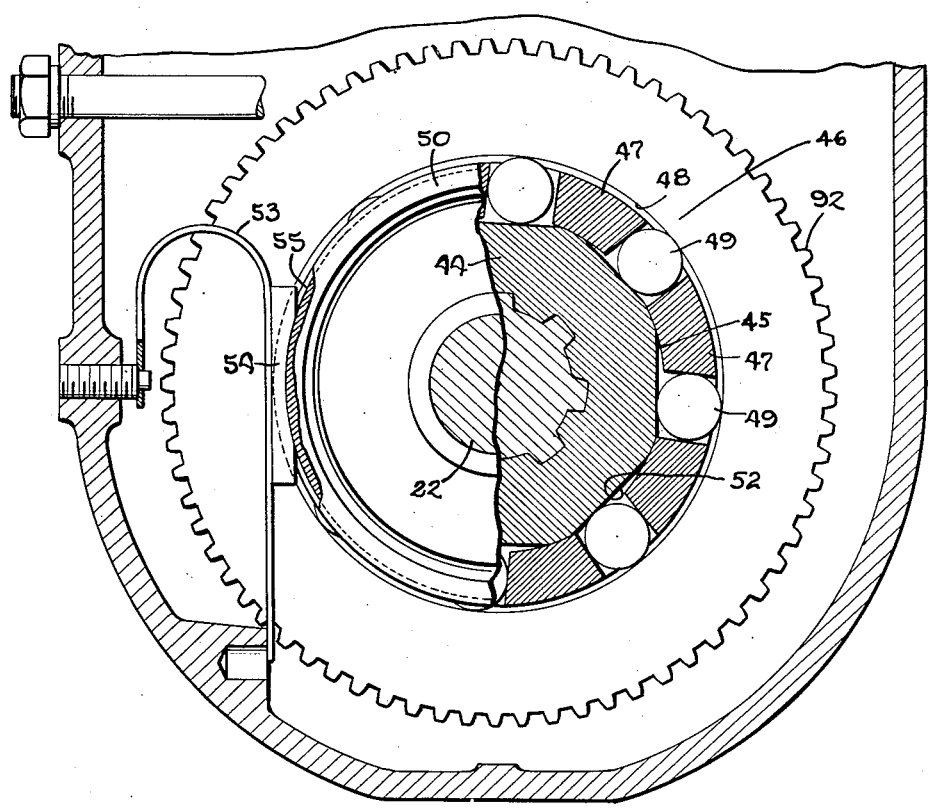
Fig. 3 is a sectional view taken along the line 3—3 in Fig. 6.

The two-way overrun devices employed in the present system may take various forms in fulfilling the operation indicated. A preferred form has been illustrated in connection with the several embodiments and since it is substantially identical in the several figures, a single description of such devices will suffice. With additional reference to Fig. 3, the preferred two-way overrun device comprises a driver element 44 suitably carried at the end of the part (e. g., shaft 22, Fig. 2) which rotates more slowly when the device freely slips, this driver element being provided with a generally cylindrical surface 45 which is flattened slightly at spaced intervals therearound. The opposed end of the part (e. g., the end of the shaft 21 opposed to the shaft 22, Fig. 2) which is to rotate faster when the device freely overruns carries an overrunning element 46. The overrunning element includes a cup-shaped portion 46a (see device 25 in Fig. 2) formed by an annular flange presenting an inner cylindrical surface 48 which encompasses the surface 45 of the driver element 44. A series of rollers 49 are rotatably mounted between spaced fingers 47 formed in an annular carrier ring 50 rotatably disposed on a land surface 51 (Fig. 2) of the driver element 44, the rollers being thus disposed between the outer peripheral surface 45 on the driver element and the inner surface 48 of the overrunning element. The outer peripheral surface 45 of the driver element 44 (Fig. 3) is formed to define alternate, arcuate, concentric portions and wedging portions 52 which are flat or only slightly curved. The extent and curvature of the wedging portions 52 provided on the periphery of the driver element 44 and the diameter of the rollers 49 are such that there is a slight clearance between the rollers and the opposed surfaces 45 and 48 on either side when they are centered in position on the wedging portions 52. The rollers 49 are adapted to become wedged or locked between these opposed surfaces 45 and 48 when they move to either side of the center of the wedging portions 52, thus positively locking together the overrunning and the driver elements 46 and 44 in either direction of rotation.

Means are provided for imposing a frictional drag on the intermediate, floating carrier ring 50, and this means may comprise a brake block 54 or other friction element slidably engaged in a peripheral groove 55 under the bias of a mounting spring 53. The friction drag on the carrier ring 50 tends to cause the rollers 49 to be carried from their center position toward the trailing edges of the wedge portions 52. If the overrunning element 46 is turning faster than the driving element 44, no wedging or locking can occur because the overrunning element tends to return the rollers to their central positions. The rollers 49 thus spin in their carrier ring 50. However, should the overrunning element 46 tend to rotate more slowly than the driver element 44, the rollers 49 become wedged between the surfaces 48, 45 and locking occurs to positively drive the overrunning element at the speed of the driver element. It will be apparent that this action takes place in either direction of rotation, and that once locked, the elements will automatically be unlocked when the overrunning element again runs faster than the driver element.

It will be clear from Fig. 2 that the first overrunning device 25 has its overrunning element 46 suitably splined to the front drive shaft 21 and its driver element 44 integrally formed on the forward end of the rear drive shaft 22. No positive interaction occurs between the front and rear drive shafts, therefore, as long as the front drive shaft rotates faster than the rear drive shaft, but upon a reversal of this condition, locking of the first device obtains and the forward drive shaft 21 is driven positively from the rear drive shaft 22 through the first overrunning device.

The second overrunning device 26, substantially identical to the first, has its overrunning element 46 integrally formed with the rear sun gear 39 of the center differential and its driver element 44 splined or fixedly carried by the planet carrier shaft 32. Thus, as long as the rear sun gear rotates faster than the planet carrier, no interaction occurs; but upon an overspeeding of the planet carrier relative to the rear sun gear in either direction, locking occurs and power may be transferred directly from the planet carrier 32 through the second overrun device 26 to the sun gear 39 and thence directly through the matching spur gears 42—43 to the rear drive shaft 22.

*Operation*

The operation of the drive system may best be described by first considering the normal relative speeds of rotation for the various parts. It will be understood that the explanation is applicable for either direction of rotation of the several parts, i. e., whether the vehicle is being driven in a forward or reverse direction. During level, straight travel, the front and rear wheels, if of equal radii, have the same angular speed but by virtue of the different ratios for the front and rear differential pinion and ring gears 28—29 and 30—31, the front drive shaft 21 is rotating a predetermined percentage faster than the rear drive shaft 22, both turning in the same direction. The first overrun device 25 thus slips freely. By virtue of selected ratios for the front and rear spur gears 40—41 and 42—43, however, the front sun gear 38 may be rotating considerably slower than the front drive shaft 21 and the rear sun gear 39 faster than the rear drive shaft 22. As a result, the rear sun gear 39 turns faster than the front sun gear 38, with the center differential "working" and its planet carrier shaft 32 rotating a predetermined percentage more slowly than the rear sun gear 39. The second overrun device 26 thus also slips freely. The result achieved is a full differential action between the front and rear drive shafts until such time as one of the two-way overrun devices locks.

If the rear wheels should be more heavily loaded to decrease their effective radii, they may still be power driven with no scrub by virtue of this differential action until they overspeed relative to the front wheels by a predetermined amount. Similarly, increased loading of the front wheels, and cornering of the vehicle causing them to rotate faster than the rear wheels, are accommodated by differential action with continued drive application and without tire scrub. If, however, one or both of the rear wheels should lose traction and tend to spin freely to the extent that the rear drive shaft 22 tends to exceed the speed of the front drive shaft 21, the first overrun device 25 locks the two shafts together so that the front wheels must also turn and exert tractive effort in propelling the vehicle. Similarly, if one or both front wheels should tend to spin freely, the front drive shaft 21 will speed up and tend to take the entire output of the center differential 20. However, this will result in the planet carrier shaft 32 tending to overspeed the rear sun gear 39 whereupon the second device 26 locks and establishes positive drive from the planet carrier 32 through the second device 26 and spur gears 42—43 to the rear drive shaft 22. Thus, the rear wheels have a first limited differential freedom, e. g., two or three percent as chosen by the ratios of the front and rear pinion and ring gears 28—29 and 30—31. The front wheels have a second limited differential freedom, e. g., twenty percent as chosen by the ratios of the mating spur gears 40—41 and 42—43. Overspeeding of the rear wheels 14 relative to the front wheels 13 beyond the first predetermined amount results in positive drive to the front wheels through the first device 25; and overspeeding of the front wheels relative to the rear wheels beyond the second predetermined amount results in a positive drive to the rear wheels through the second device 26. The predetermined permissible overspeeding of the rear wheels need not be as great because decreases in rear tire diameters due to loading are normally small; the predetermined permissible overspeeding of the front wheels is preferably greater, since the front wheels need to overrun the rear by a considerable amount when the vehicle executes turns.

The present drive arrangement serves also to proportion the torque and power between the front and rear wheels. More torque is supplied to the rear wheels in this instance since they will usually carry more weight in the vehicle illustrated. As described above, under normal driving conditions the center differential 20 is "working," i. e., its planet gears 34 rotating, and the rear sun gear 39 is turning faster than the front sun gear 38. It is fundamental that in such a differential the torques exerted on the sun gears are equal regardless of their relative speeds. Consequently, more power (product of torque and speed) is supplied through the rear sun wheel 39, spur gears 42 and 43, and drive shaft 22 to the rear wheels 14 than is supplied to the front wheels 13. And, since both front and rear wheels are of substantially the same radius and turn at substantially the same angular speed, the torque exerted by the rear wheels is greater. The degree of torque proportioning varies with the ratios selected for the spur gears and may be chosen to substantially agree with the corresponding proportions of the total vehicle weight carried by the front and rear wheels.

As previously described, provision is made for each of the half axles 10 and 11 to carry discs 17 for disc-type four wheel braking, although it will be understood that other types of brakes may be employed. For example, a single brake might be provided on the shaft for the driving gear 36, or alternatively, a pair of brakes may be employed one on each of the two drive shafts 21 and 22. All of these arrangements will provide four wheel braking action which will be enhanced by the present drive system as described below.

In the braking of a vehicle, a serious situation arises upon the locking and skidding of one wheel on a slippery surface. In that event, one-fourth of the brake pedal effort is ineffective in retarding the vehicle, because it serves only to lock a skidding wheel, and is not transferred to other wheels having traction. The present four wheel drive system, in addition to the advantageous drive operation noted, is effective to prevent such locking and skidding of one wheel and to provide more positive braking. Assume, by way of example, that one of the front wheels 13 locks and skids on braking, while the other wheels maintain good traction. This will tend to cause the front drive shaft 21 for the front differential 23 to be reduced in speed by fifty percent. However, such reduction cannot occur, for the rear drive shaft 22 would tend to overspeed the front drive shaft, whereupon the first two-way overrun device 25 will lock, positively connecting the front drive shaft to the rear wheels. Assuming that the rear wheels maintain full road-grip, the effect will be that the "skidding" wheel will rotate at a precentage below normal speed equal to twice the predetermined percentage selected for freedom of the rear wheels. The braking effort applied to the skidding wheel will thus be transferred to the rear wheels and the corresponding effect of the brake pedal pressure for the skidding wheel will not be lost. Thus, even though one wheel loses traction, and tends to lock and skid, the effect of all four brakes is still available. The same action will take place in the event of a rear wheel skidding, except that the second overrun device 26 will come into play.

*Modified embodiments of the four wheel drive system*

Referring now to Fig. 4, a first modified embodiment of the four wheel drive system may be made to provide equal division of torque betwen front and rear wheels and still achieve the limited differential action described. Insofar as like parts are shown, reference characters corresponding to those employed in Fig. 2 also appear in Fig. 4. This modification is different in that the second two-way overrun device 26 is not placed directly between the planet carrier shaft 32 and the rear sun wheel 39. Rather, the front and rear sun wheels 38 and 39 respectively include additional integral spur gears 60 and 61 driving mating gears 62 and 63 on countershafts 64 and 65, and the second two-way overrun device 26 is interposed between the countershafts. The driver element 44 of the second two-way overrun device 26 is carried or formed integrally on the countershaft 64 driven from the front sun gear 38 and the overrunning element 46 carried or formed integrally with the other countershaft 65. It will be seen, however, that in this arrangement the overrun device is still drivingly interposed between two elements of the differential 20, i. e., between the sun gears 38 and 39, the gears 60, 62 and 61, 63 serving merely as drive connections.

The gear ratios for the drive connections between the front sun gear 38 and front drive shaft 21 and between the rear sun gear 39 and rear drive shaft 22 may be chosen so that under normal conditions when the front drive shaft 21 rotates slightly faster than the rear drive shaft 22 (and drive the front and rear wheels at the same angular speed by virtue of the different ratios for the front and rear pinions 28—30 and ring gears 29—31), then the sun gears both rotate at the same speed. The ratios for the spur gears 60—62 and 61—63 between the sun wheels 38 and 39 and the countershafts 64 and 65 are chosen so that the first countershaft 64 is normally overrun by the second, and the second overrun device 26 between them normally slips freely.

Differential action may take place between the front and rear drive shafts 21 and 22, as previously explained, up to a first predetermined overspeeding of the rear wheels 14 relative to the front wheels 13 whereupon the first overrun device 25 between the two drive shafts locks them together. Overspeeding of the front wheels relative to the rear wheels may take place up to a second predetermined limit dependent upon the gear ratios for the countershafts. When this limit is exceeded and the front countershaft 64 tends to overspeed relative to the rear countershaft 65, the device 26 between them locks and creates a coupling between the two sun gears 38 and 39. Both drive shafts are then positively driven. Because during normal conditions the two sun gears rotate at the same speed and with the same torque, the power from the engine is equally divided between the front and rear drive wheels. By changing the ratios for the sun gear-drive shaft spur gears 40—41 and 42—43, however, torque may be proportioned as desired. Changing of the ratios for the sun gear-countershaft spur gears 60—62 and 61—63 may serve to change the predetermined overspeeding limit for the front wheels without any effect upon torque division, while changing of the front and rear differential pinion and ring gear ratios may serve to change the predetermined overspeeding limit for the rear wheels. The torque proportioning, the degree of permissive freedom for the front wheels on cornering, and the degree of permissive freedom for the rear wheels on changes of tire radii are thus all individually selectable.

Referring to the second modification of the drive system shown by Fig. 5, the arrangement is characterized by its simplicity and compactness. The center differential 20 has its planet carrier in the form of a cage 66 formed as an integral portion of the carrier shaft 32, which in this instance is hollow. The cage 66 is adapted to be driven from the engine through the transmission output gear 36 and the gear 35 fixed to the shaft 32. The pinions 28 and 30 and ring gears 29 and 31 for the front and rear differentials 23 and 24 have different ratios as previously described. In this arrangement the differential sun wheels 38 and 39 are mounted integrally on opposed ends of the front and rear drive shafts 21 and 22, and the first two-way overrun device 25 is disposed between them within the center differential cage 66. It will be noted here again that the overrun device 25 is drivingly interposed between two of the three elements of the differential 20; specifically between the two sun gears 38, 39. The front drive shaft 21 drives a first countershaft 68 through speed change means shown as spur gears 69 and 70, while the rear drive shaft 22 is connected to a second countershaft 71 through speed change means shown as spur gears 72 and 73. The second overrun device 26 is interposed between the two countershafts 68 and 71 connected to permit the second to overrun the first. Since the countershafts 68, 71 are driven by the gears 70, 69 and 73, 72 from the drive shafts 21 and 22 which are splined to the sun gears 38, 39, the device 26 is drivingly connected between two of the three elements of the differential 20.

Under normal conditions, as explained before, the front drive shaft 21 runs slightly faster than the rear drive shaft 22 when the front and rear wheels are driven at the same angular speed. The first device 25 in the cage 66 thus slips freely. The ratios for the spur gears 69—70 and 72—73 are selected, however, such that the second countershaft 71 is then driven faster, by a predetermined percentage, than the first countershaft 68, and the second device 26 also slips freely. Again, free differential action is obtained within selected limits, the first overrun device 25 locking upon a first predetermined overspeeding of the rear wheels 14, and the second overrunning device locking the drive shafts together, through the countershafts 68 and 71, upon a second predetermined overspeeding of the front wheels 13.

A third modified embodiment of the four wheel drive is illustrated by Fig. 6. This form is particularly desirable because it may accomplish the advantageous operation described above without special ratios for the front and rear differential pinions 28 and 30 and ring gears 29 and 31. Further, it requires relatively simple parts. The drive in this embodiment includes the front and rear differentials 23 and 24 driven respectively by the front and rear drive shafts 21 and 22. The center differential 20 powers the two drive shafts 21 and 22, being driven from the engine by the output gear 36 through a geared countershaft or layshaft 80. Speed change means in the form of gears serve to connect the front and rear drive shafts 21 and 22 to the layshaft 80 through the first and second overrun devices 25 and 26. These overrun devices are substantially the same as described above, and with the speed change gearing serve to limit the range of differential action between the front and rear pairs of wheels to predetermined ranges.

The three element center differential 20 in this instance has its intermediate element or planet carrier in the form of a one-piece cage 81 journaled in ball bearings 82 and rotatably fitted on the shanks of the sun wheels 38 and 39. The latter are splined to the opposed ends of the drive shafts 21 and 22 respectively and driven by the planet gears 34 rotatably carried on a pin 84 in the cage 81. The cage 81 has a gap 85 to enable assembly of the various parts. The cross section of the cage is taken in different planes in order to illustrate this gap 85 in Fig. 6. A ring gear 86 is fixed to the cage 81 and has a splined connection 84a with the ends of the pin 84 both to retain it in place and prevent it from rotating.

The layshaft 80 is journaled above the center differential by bearings 88. It carries three integral or splined spur gears 89, 90 and 91, the latter being centrally located and meshed with the ring gear 86. Power may be supplied to the center differential by connection directly to the ring gear 86, or as shown, through the layshaft 80. Input power from the transmission gear 36 may be applied to any of the gears 89, 90, or 91, and in this instance it is applied to the aft gear 90.

The first two-way overrun device 25 has the outer periphery of its overrunning element 46 geared at 92 to be driven by the layshaft gear 90. This overrunning element is rotatably mounted on a land surface 93 of the driver element 44. The latter element is splined fast on the rear drive shaft 22. The carrier ring 50 is rotatably disposed on the driving element as previously described, with the rollers 49 interposed between the surfaces 45 and 48. It will thus be apparent that the overrun device 25 is drivingly interposed between two of the three elements of the differential 20. Its driver 44 is rigid with the terminal element or sun gear 39, and its overrunning member 46 is connected by gears 92, 90, layshaft 80 and gears 91, 86 to the intermediate element or planet carrier 81.

In a similar manner, the second two-way overrun device 26 has its overrunning element 46 geared at 95 to be driven by the layshaft gear 89. The overrunning element 46 is journaled on a land surface 96 of the driver element 44, which in turn is splined fast on the front drive shaft 21. Here again, the device 26 is drivingly interposed between two of the three elements of the differential 20. The driver 44 is rigid with the terminal element or sun gear 38, and the overrunning member 46 is connected by gears 95, 89, layshaft 80 and gears 91, 86 to the intermediate element or planet carrier 81.

The three sets of matching gears 89—95, 90—92, and 91—86 may have their ratios chosen so that during normal operation when the front and rear wheels are driven at the same speed, the overrunning elements 46 of the devices 25 and 26 run faster than the drive shafts 21 and 22 and slip freely with respect to their corresponding driving elements 44. That is, in normal operation the layshaft 80 is driven from the transmission output gear 36 through gear 90, and it in turn drives the cage 81 through gears 91 and 86. The center differential 20 thus drives the front and rear drive shafts 21 and 22 at the same speed, and hence, the front and rear wheels at the same speed. However, the speed ratios between the gears 89 and 95 and between the gears 90 and 92 are selected so that the overrunning elements 46 of the devices 25 and 26 overspeed the respective drive shafts 21 and 22 and slip freely. The percentage of such normal overspeeding may be determined by the selection of the gear ratios and may be equal or unequal, as desired.

If the rear wheels 14 should tend to run slightly faster than the front wheels 13, and the rear shaft 22 to run slightly faster than the front shaft 21, no locking will occur until the rear shaft tends to overspeed relative to the overrunning element 46 of the first device 25. That is, there will be a differential freedom for the rear wheels, the range determined by the speed ratio for the gears 90—92. On the other hand, the front wheels 13 and front drive shaft 21 may overspeed with respect to the rear wheels 14 and rear drive shaft 22 (as on cornering) up to a predetermined amount before the second overrun device 26 will lock.

On slipping or spinning of the rear wheels the rear drive shaft 22 would tend to spin, taking the entire output of the center differential and leaving the front shaft 21 "dead." However, this cannot occur because upon such a tendency, the first overrun device 25 will lock the rear drive shaft 22 to the layshaft 80 through the gears 92 and 90. This precludes free action of the center differential 20 so that torque transmitted directly to both the sun gears 38, 39 and both drive shafts 21 and 22 are positively driven. During this time, the drive shaft 21 will turn more slowly than the drive shaft 22, but good tractive effort will be exerted by the front wheels. It will be understood that it is not necessary that the rear wheels 14 lose all traction and spin freely before such automatic locking occurs. Even if the vehicle is in motion and the rear wheels overspeed beyond a predetermined degree with respect to the front wheels, the locking occurs to provide positive four wheel drive. The limited freedom for the rear wheels may be only that necessary to accommodate, without locking and with differential action, their relative overspeeding occasioned by reductions in radii, as caused by heavy loading for example. Such freedom may be in the order of 2.7 percent.

In a similar manner, relative overspeeding of the front wheels beyond a predetermined percentage will cause the second two-way overrun device 26 to lock the front drive shaft 21 to the layshaft 80 through the gears 89—95. This inhibits free action of the center differential 20 so that torque is supplied to both the sun gears 38, 39 to provide direct drive to both shafts 21 and 22. During this time, the rear drive shaft 22 will turn more slowly than the front drive shaft 21, with the differential planet gears "working." The speed change ratio for the gears 89 and 95 may be selected, however, so that locking does not take place upon such overspeeding of the front shaft 21 as occurs upon cornering of the vehicle. For example, the speed step-up afforded by the gears 89 and 95 may be such that the second device 26 does not lock until the front shaft 21 overspeeds the rear shaft 22 by about 14.6 percent.

In the operation described, when the front and rear wheels are driven at the same angular speed, the front and rear drive shafts 21 and 22 are also turning at the same speed because the front and rear differential pinions and ring gears have the same speed change ratio. Thus, the center differential 20 is not "working" and it distributes torque equally between the front and rear pairs of wheels. However, if it is desired to proportion torque or power between the wheels, this may be done by making the ratio for the front pinion 28 and ring gear 29 different from that of the rear pinion 30 and ring gear 31. Due regard of this would be taken in selecting the speed change ratios of the gears 90—92 and 89—95 to obtain the desired ranges of free differential action for the rear and front wheels respectively.

In the foregoing description, reference has been made to the automatic action occurring upon relative predetermined overspeeding of either the front or rear wheels. However, it will be understood also that if only one wheel loses traction and tends to spin, then its corresponding drive shaft will speed up. Because the overrun devices in each instance are drivingly interposed between two of the three elements of the center differential 20, which, in turn, has its two terminal elements drivingly connected to the drive shafts 21 and 22, this alone will limit the freedom of the center differential, and provide positive drive to both the drive shafts.

In summary, the four wheel drive system described above functions to provide a true four wheel drive with resulting good traction, but without the attendant disadvantages of tire scrub. It provides differential freedom for the front and rear pairs of wheels only to the extent necessary and beyond that locks the front and rear drive shafts to prevent loss of all traction as a result of one or two wheels tending to overspeed or spin.

I claim as my invention:

1. In a four wheel drive for a vehicle having first and second pairs of traction wheels, the combination of first and second differentials interposed between the paired first and second wheels respectively, first and second drive shafts drivingly connected to respective ones of said differentials, one of said differentials affording rotation of its associated wheels at an angular velocity of the order of a few percent greater than that for the other pair of wheels with equal angular speeds of said drive shafts, a third differential having first and second terminal elements, means drivingly connecting said first and second elements to respective ones of said drive shafts, said third differential also having an intermediate element adapted to be driven from a prime mover for the vehicle, a first two-way overrun device interposed between said drive shafts for locking the same together when the said second drive shaft tends to overspeed the first drive shaft, a second two-way overrun device and means drivingly connecting the same between two of said three differential elements, said two connecting means having drive ratios which together cause said second overrun device to normally slip freely but which cause said second overrun device to lock whenever said first drive shaft tends to overspeed said second drive shaft by a predetermined amount of the order of twenty percent.

2. In a four wheel drive for a vehicle having front and rear pairs of traction wheels, the combination of front and rear differentials interposed between the paired front and rear wheels respectively, front and rear drive shafts drivingly connected to respective ones of said differentials, one of said differentials affording rotation of its associated wheels at an angular velocity of the order of a few percent greater than that for the other pair of wheels with equal angular speeds of said drive shafts, a third differential having first and second terminal elements, means drivingly connecting said first and second elements to respective ones of said drive shafts, said third differential also having an intermediate element adapted to be driven from a prime mover for the vehicle, a first two-way overrun device interposed between said drive shafts for locking the same together when the said rear drive shaft tends to overspeed the front drive shaft, a second two-way overrun device, and means drivingly connecting the same between two of said three elements of the third differential, said two connecting means having drive ratios which together cause said second overrun device to normally slip freely but which cause said second overrun device to lock whenever said front shaft tends to overspeed said rear shaft by a predetermined amount of the order of twenty percent.

3. In a four wheel drive automotive vehicle having an engine and front and rear pairs of wheels, a drive system comprising, in combination, front and rear differentials drivingly interposed between the respective paired front and rear wheels, front and rear drive shafts for driving said front and rear differentials respectively, said front and rear differentials having gearing with different ratios to drive the front and rear wheels at the same angular speed when said rear drive shaft turns more slowly than said front drive shaft by a predetermined percentage, a first two-way overrun device, means operatively connecting said first device between said front and rear drive shafts to drivingly connect them upon tendency of the latter to overspeed relative to the former, a second two-way overrun device, gear means operatively connecting said second overrun device between said front and rear drive shafts to drivingly connect them upon a predetermined degree of overspeeding of the former relative to the latter, and a center differential having an intermediate element adapted to be driven by the engine and having two terminal elements operatively connected respectively to drive said front and rear drive shafts.

4. In an automotive vehicle having a prime mover and first and second pairs of wheels, a four wheel drive system comprising, in combination, a first and a second drive shaft and speed change means respectively connecting them to drive the first and second pairs of wheels at the same angular speed when said first shaft rotates a predetermined percentage faster than said second shaft, a differential having first and second terminal elements and an intermediate element adapted to be driven by the engine, speed change means drivingly connecting said terminal elements respectively to said first and second drive shafts with speed change ratios such that said second element rotates faster than the first when said first and second pairs of wheels are driven at the same angular speed to thereby supply greater torque to the second pair of wheels than to the first pair of wheels, a first two-way overrun device, means effectively connecting said first device between said drive shafts to effect locking therebetween upon a first predetermined overspeeding of said first drive shaft relative to said second drive shaft in either direction of rotation, a second two-way overrun device, and means effectively connecting said second device between two of the three elements of said differential to limit the action of the latter upon a second predetermined overspeeding of said second drive shaft relative to said first drive shaft in either direction of rotation.

5. In an automotive vehicle having an engine and front and rear pairs of traction wheels, a four wheel drive system comprising, in combination, front and rear drive shafts, means including front and rear differentials for respectively connecting said shafts to drive the front and rear pairs of wheels at the same angular speed when said front shaft rotates a predetermined percentage faster than said rear shaft, a differential having a planet carrier adapted to be driven by the engine and having first and second sun wheels, gear means respectively connecting said first and second sun wheels to said front and rear drive shafts with speed change ratios such that said second sun wheel rotates a predetermined percentage faster than said planet carrier when the front and rear pairs of wheels are driven at the same angular speed, a first two-way overrun device connected between said front and rear drive shafts to lock them upon overspeeding of the latter relative to the former, and a second two-way overrun device connected between said planet carrier and said second sun wheel to lock them upon overspeeding of the former relative to the latter.

6. In an automotive vehicle having a prime mover and first and second pairs of traction wheels, a four wheel drive system comprising, in combination, first and second drive shafts, means including first and second differentials connecting said first and second shafts to drive the respective pairs of wheels at the same angular speed when said first shaft rotates a predetermined percentage faster than said second shaft, a differential having first and second terminal elements and an intermediate element adapted to be driven by the prime mover, means connecting said first and second elements respectively to drive said first and second shafts, a first two-way overrun device interposed between said first and second drive shafts to lock them upon overspeeding of the latter relative to the former, first and second countershafts and speed change means respectively connecting them to be driven from said first and second terminal elements such that said second countershaft rotates a predetermined percentage faster than said first countershaft when the pairs of wheels are driven at the same angular speeds, and a second two-way overrun device interposed between said first and second countershafts to lock them upon overspeeding of the former relative to the latter.

7. In an automotive vehicle having an engine, a pair of steerable front wheels and a pair of rear wheels, a four wheel drive system comprising, in combination, front and rear drive shafts, means including front and rear differentials connecting said front and rear drive shafts respectively to said front and rear pairs of wheels to drive the wheels at the same angular speed when said front drive shaft rotates a predetermined percentage faster than said rear drive shaft, a differential adapted to be driven by the engine and having first and second sun wheels, gear means for connecting said sun gears respectively to said front and rear drive shafts, a first two-way overrun device connected between said front and rear drive shafts to lock them upon overspeeding of the latter relative to the former, a first and a second countershaft, gear means drivingly connecting said first and second countershafts respectively to said first and second sun wheels with speed change ratios causing said second countershaft to rotate a predetermined percentage faster than said first countershaft when said front and rear wheels are driven at the same angular speed, and a second two-way overrun device connected between said first and second countershafts to lock them upon overspeeding of the latter relative to the former.

8. A four wheel drive system for a vehicle having a prime mover and first and second pairs of traction wheels, said system comprising, in combination, first and second drive shafts, means including first and second differentials connecting said drive shafts to drive the respective pairs of wheels at the same angular speed when said first shaft rotates a predetermined percentage faster than said second shaft, a differential having first and second terminal elements rigidly secured on opposed ends of said first and second shafts respectively and an intermediate element adapted to be driven by said prime mover, a first two-way overrun device interposed between the opposed ends of said first and second shafts to lock them upon overspeeding of the latter relative to the former, first and second countershafts, speed change means respectively connected between said first and second shafts and said first and second countershafts, respectively, to drive said second countershaft a predetermined percentage faster than said first countershaft when the pairs of wheels are driven at the same angular speed, and a second two-way overrun device connected between said first and second countershafts to lock them upon overspeeding of the latter relative to the former.

9. In an automotive vehicle having an engine, a pair of steerable front wheels and a pair of rear wheels, a four wheel drive arrangement comprising, in combination, front and rear drive shafts, means including front and rear differentials connecting said front and rear drive shafts respectively to said front and rear pairs of wheels to drive the wheels at the same angular speed when said front drive shaft rotates a first predetermined percentage faster than said rear drive shaft, a differential adapted to be driven by the engine and having first and second sun wheels mounted respectively on said front and rear drive shafts, a first two-way overrun device disposed between said sun wheels and connected between said front and rear drive shafts to lock them upon overspeeding of the latter relative to the former, first and second countershafts, gear means driving said first and second countershafts respectively from said front and rear drive shafts with different ratios such that said second countershaft overruns said first countershaft by a second predetermined percentage when said front and rear wheels are driven at the same angular speed, and a second two-way overrun device connected between said first and second countershafts to lock them upon overspeeding of the former relative to the latter.

10. In an automotive vehicle having an engine and front and rear pairs of wheels, a four wheel drive comprising, in combination, front and rear drive shafts, means including front and rear differentials connecting said front and rear drive shafts respectively to drive the front and rear wheels, a third differential having first and second terminal elements connected to said front and rear drive shafts respectively and an intermediate element, a layshaft adapted to be driven by the engine, means connecting said layshaft to said intermediate element, first and second two-way overrun devices having driver elements mounted respectively on said front and rear drive shafts and overrunning elements freely journaled on said drive shafts, and speed change means connecting said overrunning elements to be driven by said layshaft at speeds greater than said drive shafts when both pairs of wheels are driven at substantially the same angular speed, said overrun devices being adapted to limit the action of said third differential upon a predetermined overspeeding of one of the drive shafts with respect to the other.

11. A four wheel drive system comprising, in combination, first and second differentials adapted to drive respective pairs of wheels, first and second drive shafts connected respectively to said first and second differentials, a third differential connected to said first and second drive shafts, a layshaft adapted to be driven by an engine and including first, second, and third fixed gears, means adapting said first gear to drive said third differential, a first two-way overrun device having a driver element fast on said first drive shaft and an overrunning element adapted to be driven by said second gear, and a second two-way overrun device having a driver element fast on said second drive shaft and an overrunning element adapted to be driven by said third gear.

12. In a four wheel vehicle having steerable front wheels, a drive system for powering all four wheels from a prime mover, said system comprising, in combination, a countershaft and means for driving the same from the prime mover, a differential having two terminal elements and an intermediate element, means for drivingly connecting said countershaft and said intermediate element, first and second drive shafts for drivingly connecting said terminal elements and respective pairs of the wheels, and means including an overrunning clutch interposed between said countershaft and one of said drive shafts for imparting a positive drive connection between the two in response to a tendency of one to overspeed relative to the other by a predetermined percentage, whereby the action of said differential is limited to prevent differential speeds of said first and second drive shafts beyond a predetermined degree.

13. In a four wheel drive for a vehicle having front and rear pairs of traction wheels equipped with pneumatic tires, the combination of front and rear differentials interposed between the paired front and rear wheels respectively, front and rear drive shafts drivingly connected to the respective front and rear differentials, a third differential having first and second terminal elements drivingly connected respectively to said front and rear drive shafts and having a third element intermediate said first and second elements adapted to be driven from a prime mover for the vehicle, means including a first two-way overrun device drivingly connected between two of said three differential elements for restraining any overspeeding of the first of said two terminal elements relative to the second beyond such overspeeding as occurs on cornering of the vehicle, and means including a second two-way overrun device drivingly connected between two of said three differential elements for restraining any overspeeding of the second of said two terminal elements relative to the first beyond such overspeeding as occurs as a result of the reductions in rear wheel radii relative to front wheel radii incident to tire deflection caused by changing load.

14. In a four wheel drive for a vehicle having first and second pairs of traction wheels, the combination of first and second differentials interposed between the paired first and second wheels respectively, first and second drive shafts drivingly connected to the respective first and second differentials, a third differential having first and second terminal elements drivingly connected to respective ones of said drive shafts and having a third element intermediate said first and second elements adapted to be driven from a prime mover for the vehicle, means including a first overrun device drivingly connected between two of said three differential elements for restraining overspeeding of said first drive shaft relative to said second drive shaft beyond a predetermined percentage, and means including a second overrun device drivingly connected between two of said three differential terminal elements for restraining overspeeding of the second drive shaft relative to the first drive shaft beyond a second predetermined percentage.

15. In a four wheel vehicle having steerable front wheels, a drive for connecting all of said wheels to be driven from a prime mover comprising, in combination, a three element differential including two output elements and an input element which is adapted to be driven from the prime mover, first and second drive shafts, means drivingly connecting said drive shafts respectively to said two output elements, means connecting said drive shafts to drive respective pairs of said wheels, and means including an overrunning clutch operatively interposed between two of said three differential elements for precluding overspeeding of one of said drive shafts relative to the other of said drive shafts beyond a predetermined percentage.

16. In an automotive vehicle, the combination comprising first and second pairs of traction wheels, first and second drive shafts and means drivingly connecting them respectively to said first and second pairs of wheels, a prime mover, a three element differential device drivingly connecting said prime mover to said first and second drive shafts with freedom for differential action relative to one another, and means including two overrunning clutch devices each drivingly interposed between two of the three elements of said differential device to prevent overspeeding of either of said drive shafts by more than a predetermined rate relative to the other of said drive shafts.

17. In an automotive vehicle, the combination comprising first and second pairs of traction wheels, first and second drive shafts and means drivingly connecting them respectively to drive the first and second pairs of wheels with unlimited freedom of relative overspeeding of the two wheels in each pair, a prime mover, and means drivingly connecting said prime mover to said first and second drive shafts such that one may overspeed the other only up to a predetermined percentage of speed difference; said last-named means including a differential device having first and second elements drivingly connected respectively to said first and second drive shafts and a third element driven from said prime mover, an overrunning clutch device having driver and overrunning members, drive means effectively connecting said members respectively to two of said three differential elements, said drive means having drive ratios for making said overrunning member normally turn faster by a predetermined percentage than said driver member whenever said front and rear wheels turn at the same speed.

18. In a four wheel vehicle having a steerable front wheels, a drive system for powering all four wheels from a prime mover, said system comprising, in combination, a differential having two terminal elements and an intermediate element, means for driving said intermediate element from the prime mover, means drivingly connecting said two terminal elements to respective pairs of the four wheels, a first overrun device drivingly connected between one of said terminal elements and said intermediate element, and a second overrun device drivingly connected between the other of said terminal elements and said intermediate element.

19. In an automotive vehicle having front and rear pairs of wheels and a prime mover, a drive system comprising, in combination, a differential having an intermediate element adapted to be driven from the prime mover and having first and second terminal elements adapted to respectively drive said front and rear pairs of wheels, first and second overrun devices each having a driver member and an overrunning member, and drive means connecting each of said overrun devices between one of said terminal elements and said intermediate element with a ratio such that each overrunning member overspeeds its corresponding driver member by a predetermined percentage when said front and rear wheels turn at the same speed.

References Cited in the file of this patent

UNITED STATES PATENTS

| | | |
|---|---|---|
| 1,938,457 | McCaffery | Dec. 5, 1933 |
| 2,102,314 | Fraser | Dec. 14, 1937 |
| 2,103,143 | Brown | Dec. 21, 1937 |
| 2,206,907 | Loughridge | July 9, 1940 |
| 2,667,087 | Myers | Jan. 26, 1954 |

FOREIGN PATENTS

| | | |
|---|---|---|
| 899,607 | France | Aug. 28, 1944 |